United States Patent Office

2,719,777
Patented Oct. 4, 1955

2,719,777

PROCESS AND APPARATUS FOR PROTECTING URANIUM HEXACHLORIDE FROM DETERIORATION AND CONTAMINATION

David Lipkin, Santa Fe, N. Mex., and Samuel I. Weissman, Chicago, Ill., assignors to the United States of America as represented by the United States Atomic Energy Commission No Drawing. Application March 9, 1945,
Serial No. 581,950

7 Claims. (Cl. 23—14.5)

This invention relates to a method of handling uranium compound and more particularly is concerned with a method of processing and/or storing uranium hexachloride wherein said hexachloride is confined within metallic surfaces comprising nickel.

There is a present need for large quantities of the uranium isotope having mass number 235. Uranium as obtained from natural sources comprises the aforementioned isotope mixed with two others having the mass numbers 234 and 238, in the ratio $U^{234}:1::U^{235}:120::U^{238}:16,700$.

An apparatus capable of effecting a separation of desired components from a mixture of these isotopes, called a "calutron," is described in the copending application of Ernest O. Lawrence, Serial No. 557,784, filed October 9, 1944. Such a calutron essentially comprises means for vaporizing a quantity of material containing an element (for example, uranium) which is to be enriched with a selected one of its plurality of isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of the ions being proportional to the square roots of the masses of the ions, whereby the ions are concentrated in accordance with their masses; and means for deionizing and collecting the ions of the selected isotopes thus concentrated, thereby to produce a deposit of the element enriched with the selected isotope.

The device for supplying the vapor of a material, such as a uranium compound, that is to be treated in a calutron ordinarily comprises a heater with a tubular chamber in which is set a vaporizing vessel, commonly called a "charge bottle," containing a charge of a uranium compound that volatilizes readily upon heating. Uranium hexachloride, which can be satisfactorily sublimed at about 100° C. under $10^{-4}$ mm. mercury absolute pressure, has been found to be especially suitable for charging these devices. Uranium hexachloride is a highly hygroscopic compound and decomposes readily when exposed to ordinary atmospheric conditions.

For example, when uranium hexachloride is loaded into a charge bottle under ordinary atmospheric conditions, the uranium hexachloride particles usually become covered with a coating of a relatively non volatile substance, probably uranyl chloride ($UO_2Cl_2$). This coating impedes volatilization of the hexachloride, thereby necessitating higher vaporizing temperatures which, in turn, induce decomposition of the charge to relatively less volatile uranium compounds, such as the tetrachloride.

It is an object of this invention to provide an improved method of storing uranium hexachloride to prevent contamination of said chloride by the metals comprising the inner surface of the storage receptacle.

It is another object of this invention to provide a method of storing uranium hexachloride to render it substantially free of contaminants caused by deterioration thereof, and a suitable charge for a calutron.

Still another object of the invention is to provide a method of reducing deterioration of uranium hexachloride by hygroscopic influences.

Still another object of the invention is to provide an improved method of protecting uranium hexachloride from surface depositions of uranyl chloride ($UO_2Cl_2$).

A still further object of the invention is to provide a method of processing and/or storing uranium hexachloride wherein catalytic or other decomposition of said chloride is substantially reduced.

Still another object of the invention is to provide a process for subliming uranium hexachloride wherein substantial decomposition of the uranium hexachloride is alleviated.

A further object of the invention is to provide a receptacle adapted for the storage of uranium hexachloride with a minimum of decomposition of the hexachloride and with a minimum of corrosion of the receptacle with resulting contamination of the hexachloride.

A general advance in the art and other objects which will appear hereinafter are also contemplated.

In accordance with this invention a method has been discovered wherein one or more of the foregoing objects may be accomplished by processing and/or confining uranium hexachloride within vessels having the surface exposed to said uranium hexachloride composed of at least 65% nickel. In this manner substantially complete stability of the uranium hexachloride is obtained as well as freedom from contamination from the confining surfaces.

In order to demonstrate the stability of uranium hexachloride in the presence of nickel or a suitable alloy thereof in accordance with our invention the following tests were performed. About 1 gram of uranium hexachloride and a strip of the material under examination were placed in a glass tube. After a thorough outgassing of the tube and its contents it was sealed off in vacuum. The tube was then kept at 100° C. for twenty-four hours. At the end of this period the tube was examined for the pressure of chlorine gas and the strip was examined for evidence of corrosion.

Nickel and alloys thereof comprising at least 65% nickel, such as Monel metal (Ni, 67; Cu, 30; Fe, 1.4; Mn, 1; C, 0.15; Si, 0.1), Inconel (Ni, 79.5; Cr, 13; Fe, 6.5; Mn, 0.25; Si, 0.25; C, 0.08; Cu, 0.20), Nichrome (Ni, 80; Cr, 20) and the like, were found to be substantially completely unattacked under the test conditions described in the foregoing and moreover did not bring about the formation of chlorine, or in other words, did not cause any appreciable decomposition of the uranium hexachloride. A large number of other materials of construction were tried in accordance with the process of our invention, including molybdenum, stainless steel, graphite, brass, lead, aluminum, copper, silver, and mercury, all of which caused decomposition of the uranium hexachloride and/or were corroded due to the presence of said chloride.

In view of the foregoing, it will be noted that we have provided a method of processing and/or storing uranium hexachloride wherein said chloride is rendered substantially secure from decomposition and of high purity by reason of freedom from the contaminance of corrosion.

Many apparently widely different embodiments of this invention may be made without departing from the principle, breadth, and spirit thereof and it is to be understood, therefore, that this invention is not limited to the specific embodiments shown herein except as encompassed by the following claims.

What is claimed is:

1. The methol of protecting uranium hexachloride from deterioration and contamination comprising inserting said uranium hexachloride into a hermetic container having interior surfaces which are fabricated of an alloy composed of at least 65% nickel alloyed with materials selected from the group consisting of copper, iron, manganese, carbon, silicon, and chromium, contacting said uranium hexachloride with said surfaces, hermetically sealing said container, and maintaining said seal on said container.

2. The method of protecting uranium hexachloride from deterioration and contamination comprising inserting said uranium hexachloride into a hermetic container having interior surfaces fabricated of Inconel metal, contacting said surfaces with said uranium hexachloride, and hermetically sealing said container.

3. The method of inhibiting the deterioration and contamination of uranium hexachloride while at temperatures below the normal dissociation temperature thereof comprising inserting said uranium hexachloride into a hermetic container having interior surfaces formed of a material selected from the group consisting of nickel and nickel alloys which contain at least 65% nickel alloyed with materials selected from the group consisting of copper, iron, manganese, carbon, silicon, and chromium to which uranium hexachloride is inert, contacting said surfaces with said uranium hexachloride, hermetically sealing said container, and maintaining said uranium hexachloride within said sealed container below said normal dissociation temperature.

4. In a process including the sublimation of uranium hexachloride at temperatures below the normal dissociation temperature thereof and at subatmospheric pressure, the steps comprising vaporizing said uranium hexachloride from a first zone heated to a temperature below the normal dissociation thereof and maintained at subatmospheric pressure, and condensing said vaporized uranium hexachloride in a second zone in communication with said first zone, said zones being defined by surfaces which are formed of a material composed of at least 65% nickel alloyed with materials selected from the group consisting of copper, iron, manganese, carbon, silicon, and chromium, whereby said uranium hexachloride may contact only said material throughout said steps, thereby inhibiting deterioration and contamination of said uranium hexachloride during said sublimation.

5. In a process including the sublimation of uranium hexachloride, the steps comprising vaporizing said uranium hexachloride in a first zone defined by surfaces fabricated of Inconel metal maintained at a temperature below 100° C. and at a pressure below $10^{-4}$ mm. Hg absolute, transporting said vaporized uranium chloride to a second similarly defined zone in communication with said first zone, and condensing said uranium hexachloride in said second zone, thereby substantially inhibiting deterioration and contamination of said uranium hexachloride.

6. The method of protecting uranium hexachloride from deterioration and contamination comprising inserting said uranium hexachloride into a hermetic container having interior surfaces fabricated of Monel metal, contacting said surfaces with said uranium hexachloride, and hermetically sealing said container.

7. The method of protecting uranium hexachloride from deterioration and contamination comprising inserting said uranium hexachloride into a hermetic container having interior surfaces fabricated of Nichrome metal, contacting said surfaces with said uranium hexachloride, and hermetically sealing said container.

References Cited in the file of this patent

UNITED STATES PATENTS 2,226,471  Jenness _____ Dec. 24, 1940

OTHER REFERENCES

"Materials Used in Chemical Engineering Operations," Roetheli et al., Mass. Institute of Tech., Industrial and Eng. Chem., vol. 24, 9, page 1022, September 1932.

Bulletin T-5, "400 Practical Applications of Monel, Nickel and Inconel," page 7.

Mellor, "Comprehensive Treatise on Inorganic and Theoretical Chemistry," 1932, vol. 12, page 84.

Chemical and Metallurgical Eng., New York, N. Y., "Properties of Corrosion-Resistant, Heat-Resistant and Electrical-Resistance Alloys of General Mfd. Interest."

Barnes, Nickel and Monel Equipment, Ind. and Engineering Chemistry, vol. 31, page 847 (1939).